United States Patent Office 3,297,095
Patented Jan. 10, 1967

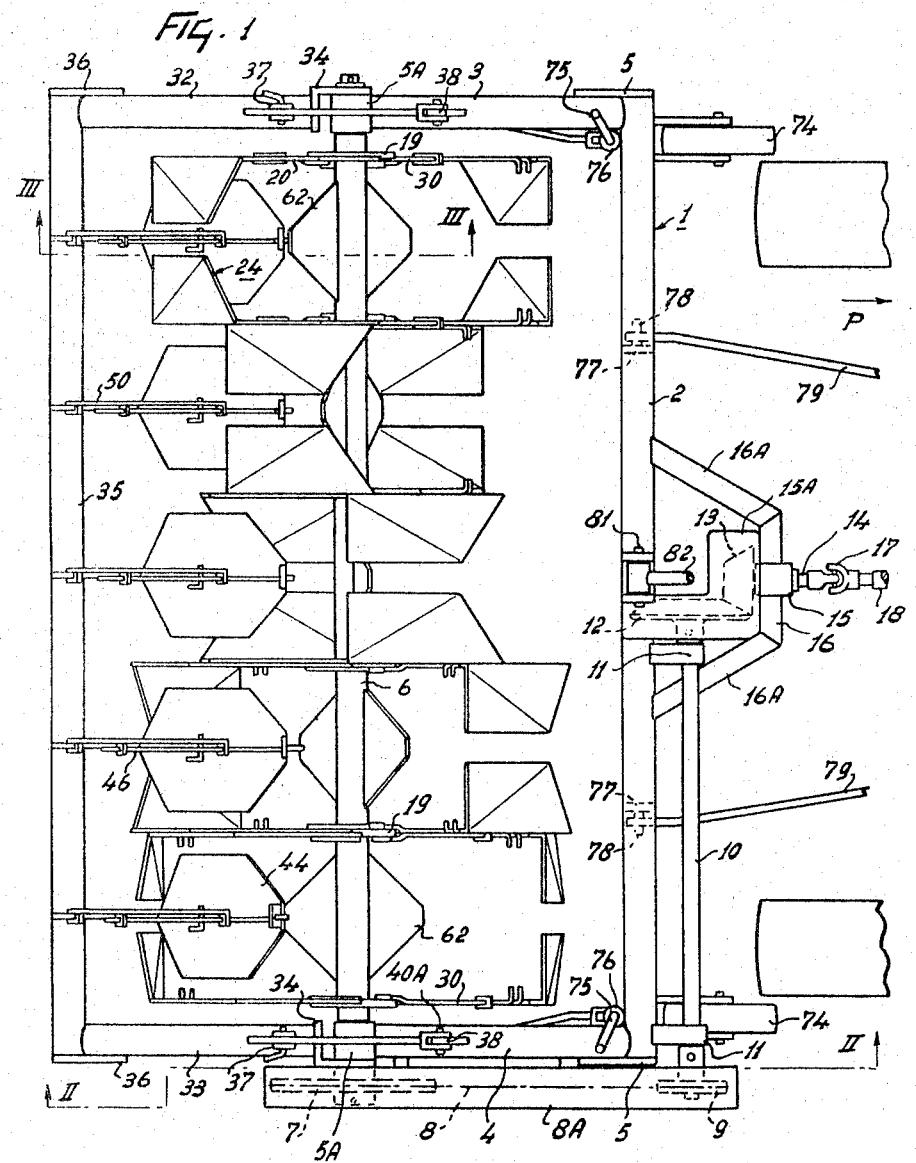

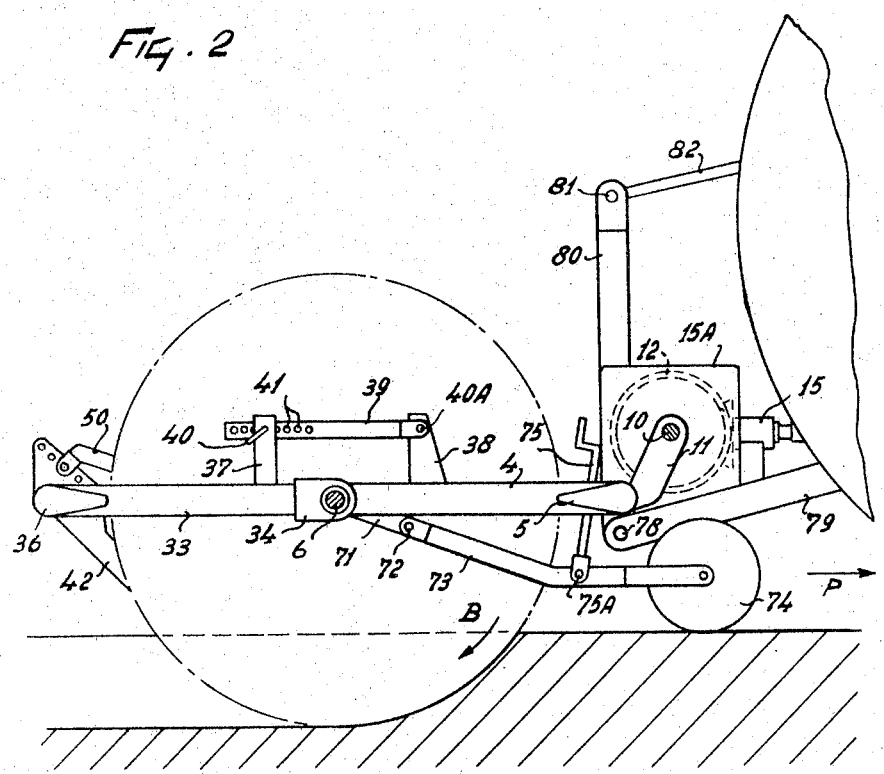

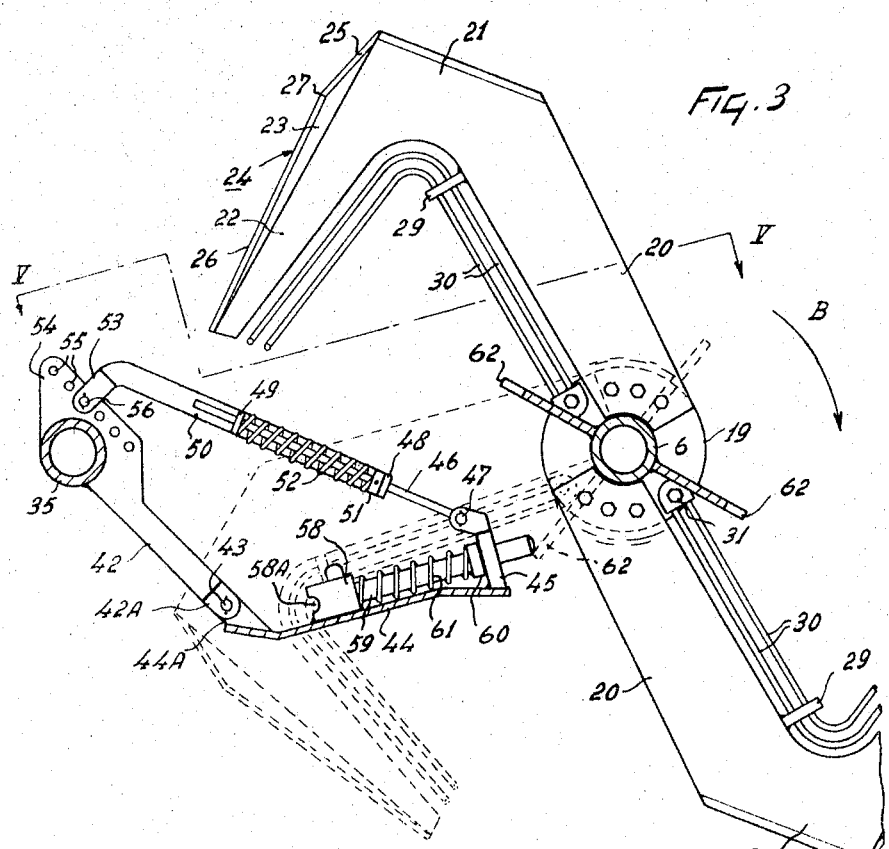

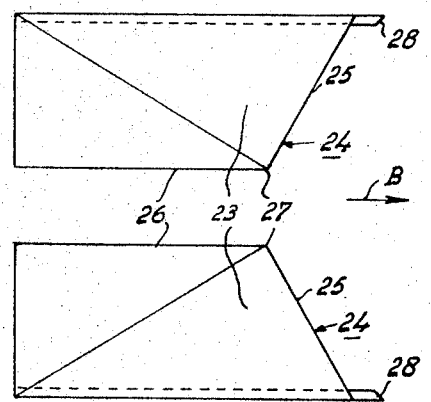
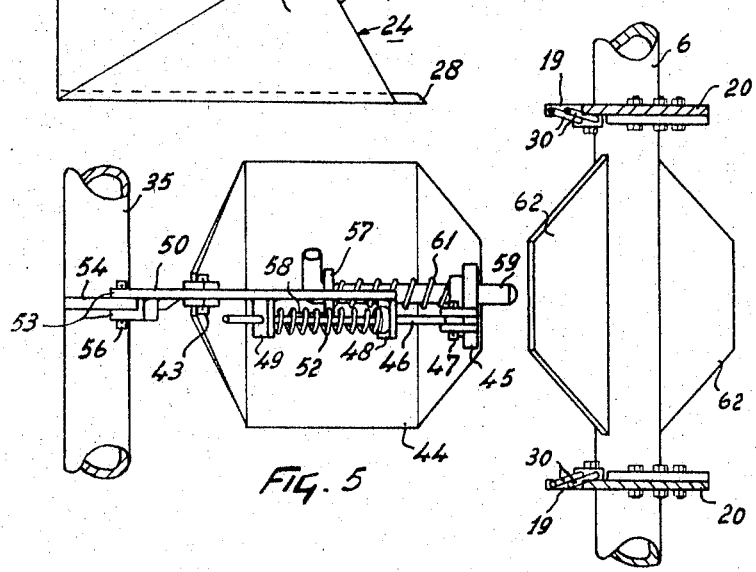
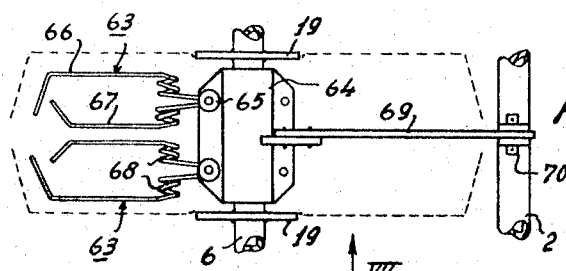
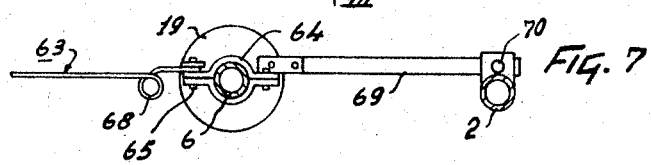

3,297,095
ROTARY PLOW
Cornelis van der Lely, Zug, Switzerland, assignor to C. van der Lely N.V., Maasland, Netherlands, a Dutch limited-liability company
Filed June 23, 1965, Ser. No. 480,230
17 Claims. (Cl. 172—39)

This application is a continuation-in-part of application Serial No. 254,382, filed January 28, 1963, now abandoned.

This invention relates to a soil cultivating device.

According to a first aspect of the present invention, there is provided a soil cultivating device comprising a frame movable over the ground and supporting a rotatable shaft carrying a cutting member which is so arranged that, during its rotary movement in operation, it cuts into the soil and for a part of every revolution lifts portions of soil away from the ground, the device further comprising a scraping member for removing said portions of soil from said cutting member, the scraping member being located to as to cooperate with said cutting member while the latter is moving upwardly. This ensures that cultivation of the soil is forced and not much dependent upon the condition thereof, the soil being sufficiently turned over and being deposited effectively where required.

According to a second aspect of the present invention, there is provided a soil cultivating device comprising a frame movable over the ground and supporting a rotatable shaft carrying cutting members for cutting up the soil in operation, each cutting member being fixed at one end to the shaft and being so dimensioned that the distance of its free end from the axis of the shaft is at least 40 cms., the shaft being associated with transmission means arranged to drive the same at a rotational speed of less than 100 revolutions per minute. This ensures effective digging.

According to a third aspect of the present invention, there is provided a soil cultivating device comprising a frame movable over the ground and carrying a rotatable shaft supporting a cutting member for cutting up the soil in operation, said cutting member being fixed to the shaft through the intermediary of a support, there being catching means in the proximity of the support and rotatable therewith, the arrangement being such that, in operation, the catching means carries along earth cut by said cutting member. The turning over of the soil is facilitated by the catching means.

According to a fourth aspect of the present invention, there is provided a soil cultivating device comprising a frame movable over the ground and supporting two cutting members arranged to rotate about a common axis, the ends of said two cutting members remote from said axis facing each other and having cutting edges which extend towards each other and to the rear, with reference to the intended direction of rotation of said cutting members. The loosened earth is thus carried effectively between two cutting members.

For a better understanding of the invention and to show how the same may be readily carried into effect, reference will now be made by way of example to the accompanying drawings, in which:

FIGURE 1 is a plan view of a soil cultivating device,

FIGURE 2 is a side elevation from the line II—II in FIGURE 1, parts of the device having been omitted, FIGURE 3 is on an enlarged scale a sectional elevation of a detail taken on the line III—III in FIGURE 1, FIGURE 4 is an elevation of a part of the detail of a pair of cutting members arranged side by side, FIGURE 5 is an elevation of a further part of the detail from the line V—V in FIGURE 3, FIGURE 6 is, on a smaller scale, a plan view of a modification of the detail, and FIGURE 7 is a side elevation as seen in the direction of the arrow VII in FIGURE 6.

As shown in FIGURE 1, the soil cultivating device comprises a frame 1, having a frame beam 2 extending transversely to its intended travelling direction, indicated by the arrow P in FIGURES 1 and 2. The frame beam 2 is fixed near its ends to frame beams 3 and 4, which are parallel to each other and which extend in the intended travelling direction P. The fastening of the frame beams 3 and 4 to the frame beam 2 is reinforced by plates 5 which are secured to the sides of the frame beams 3 and 4 and to the ends of the frame beam 2.

The frame beams 3 and 4 extend backwardly from the beam 2, and their free ends are provided with bearing sleeves 5A accommodating a shaft 6 which extends transversely to the direction P. A sprocket wheel 7 is secured to one end of the shaft 6, this sprocket wheel being linked by a chain 8 to a second sprocket wheel 9. The sprocket wheel 9 is fixed to a shaft 10 which extends in front of the frame beam 2 and which is journalled in bearing brackets 11 secured to the frame beam 2. The sprocket wheels 7 and 9, together with the chain 8, are surrounded by a safety screening hood 8A, fastened to the frame beam 4. (The hood 8A and the parts enclosed therein, are not shown in FIGURE 2.) The end of the shaft 10 opposite the end on which the sprocket wheel 9 is fixed, is located near the longitudinal center-line of the device. This end is provided with a bevel gear wheel 12 meshing with a corresponding gear wheel 13 which is fixed on a shaft 14. The gear wheels 13 and 14 are surrounded by a safety hood 15A. The shaft 14 extends in the direction P, and is journalled in a bearing sleeve 15. This bearing sleeve is provided on a beam 16 which is secured to the frame beam 2 by supports 16A.

The device is shown in FIGURES 1 and 2 attached to the rear end of a tractor. The end of the shaft 14 remote from the gear wheel 13 is linked by a universal joint 17 to the power takeoff shaft 18 of the tractor.

The shaft 6 has a plurality of equidistantly spaced flanges 19 fixed thereto. As shown in FIGURE 1, the number of flanges is six. The two outer flanges 19 each have two substantially aligned supporting members 20 bolted thereto (see FIGURE 3). (The "outer" flanges are those at the extreme ends of the shaft 6.) The four supporting members are in the form of flat strips which are so bent at their ends bolted to the flanges 19, that the major portion of each member extends substantially radially from and is co-planar with the associated flange 19 (see FIGURE 1). These four supporting members 20 are bolted to the inner sides of the outer flanges 19. Each of the other flanges 19 has two pairs of similar aligned supporting members 20 bolted thereto, one pair being on one side of the flange, and the other pair being on the other side. On each flange, one pair of supporting members is offset by an angle of about 36° to the other pair, as seen in a direction along the axis of the shaft 6. The supporting members 20 located on the facing sides of two adjacent flanges are arranged one behind the other, as seen in a direction along the axis of the shaft 6.

Each supporting member 20 is formed at its end remote from the shaft 6 with a portion 21 extending obliquely to the direction of rotation of the shaft 6 and flanges 19 (this direction being indicated by the arrow B in FIGURE 3). A cutting member 22 is formed on the oblique portion, which cutting member extends backwardly with respect to the direction of rotation B of the shaft 6. As may be seen from FIGURES 3 and 4, the supporting members 20 on the facing sides of two adjacent flanges 19, have their cutting members 22 arranged so that they are bent over towards each other to form portions 23. Each bent-over portion 23 is provided with cutting edges 24, each of which is composed of two parts 25 and 26. With reference to the direction B, the parts 25 extend to the rear and towards each other, and the parts 26 extend parallel to each other and to the rear. The parts 25 of the cutting edges 24 are inclined at an angle of more than 20° and less than 160° to each other. As shown, this angle amounts to about 120° in this embodiment. The transition 27 between the portions 25 and 26 is kinked so that it is located at a maximum distance from the shaft 6 (see FIGURE 3).

The distance of the end of the cutting member from the shaft 6 is greater than 40 cms. The supporting member 20 and the bent-over portion 21 thereof are formed with a cutting edge 28 on their forward sides, with reference to the direction of rotation B (see FIGURE 4). A perforated lug 29 is welded on the rear side of each supporting member 20, near the bent-over portion 21. Catching members in the form of two bars 30 are passed through the perforations in the lug 29, the bars 30 being located one behind the other with reference to the direction B. From FIGURE 3 it will be seen that each pair of bars 30 is made from a single length of spring steel wire bent to form, in general, a hairpin-shape, and are secured to the flanges 19 by bolts 31. At their ends remote from the flange 19, the bars 30 are bent over backwardly so that they are parallel or substantially parallel to the cutting member 22. Thus the cutting member 22 and the bars 30 extend backwardly with reference to the direction B. The free ends of the bars extend to the rearmost point of the cutting member. As will be seen from FIGURE 1, the bars associated with facing sides of adjacent flanges 19 have their free ends bent towards each other.

It will be seen also from FIGURE 1 that frame beams 32 and 33 are aligned with the frame beams 3 and 4, respectively, the beams 32 and 33 being arranged to turn about the axis of the shaft 6. For this purpose the beams 32 and 33 carry brackets 34 incorporating bearing openings through which the shaft 6 passes. The frame beams 32 and 33 are interconnected at their free ends by means of a frame beam 35 which is parallel to the frame beam 2. The connections between the frame beam 35 and the frame beams 32 and 33 are reinforced by plates 36, which are secured to the sides of the beams 32 and 33 and to the ends of the beam 35. Each of the frame beams 32 and 33 carries, near the bracket 34, a substantially vertical post 37 (see especially FIGURE 2) having a bifurcated upper end. The frame beams 3 and 4 similarly carry substantially vertical posts 38 located near the shaft 6. The posts 37 and 38 are pivotally interconnected by respective adjusting strips 39. Each strip 39 is received between the limbs at the upper, bifurcated end of the post 37, and a locking pin 40 is passed through any desired one of a number of holes 41 at one end of the strip 39. The other end of the strip 39 is bifurcated, and the limbs thereof pass one on either side of the post 38 and are pivotally secured thereto by a pin 40A. In this way, the rearmost part of the frame of the device, formed by the beams 32, 33 and 35, is adjustable about the axis of the shaft 6 with respect to the foremost part of the frame formed by the beams 2, 3 and 4.

To the frame beam 35 there are secured five arms 42, which are located so that, as seen in plan, each arm is located on a line intersecting the shaft 6 substantially mid-way between adjacent flanges 19 on the shaft (see FIGURE 1). The arms 42 extend from the frame beam 35 downwardly and forwardly (see FIGURE 3). The end of each arm 42 remote from the frame beam 35 is bifurcated at 42A and if formed with holes through which a pivot pin 43 can be passed so as to extend substantially horizontally and parallel to the shaft 6. A scraping member in the form of a plate 44 has a vertical lug 44A. This lug is entered between the limbs of the bifurcated end 42A and the pin 43 serves to connect the plate 44 with the arm 42. The plates 44 extend approximately horizontally between the cutting members 22 and are formed with bevelled edges on the sides facing the shaft 6. A lug 45 is fixed on each plate 44 at its edge remote from the arm 42, and a rod 46 is pivoted to this lug by means of a pin 47. The rod 46 is accommodated in bearings constituted by lugs 48 and 49 which are provided on a strip 50. A collar 51 is adjustably fixed in position on the rod 46 by a set screw. The rod is encircled by a spring 52 between the collar 51 and the lug 49, so that, with respect to the bar 50, the rod 46 is capable of moving against the action of the spring 52. The lug 48 serves at the same time as a stop for the plate 44, when the collar 51 comes into contact with such lug. The end of the bar 50 remote from the rod 46 is provided with a lug so as to produce a fork-shaped end having limbs 53. The limbs 53 are formed with aligned holes and are arranged one on each side of a vertical plate 54, which is secured to the frame beam 35. The plate 54 is in effect an upward extension of the arm 42. From FIGURE 3 it will be seen that the plate 54 is formed with a plurality of holes 55, so that the limbs 53 can be connected in any one of a number of positions to the plate by a pin 56, so that the plate 44 is adjustable about the axis of the pin 43 with respect to the shaft 6. Behind the lug 45, a second upright lug is fixed on the upper side of the plate 44. This second lug is of L-shape as seen in plan, having two limbs 57 and 58 at right-angles (see FIGURE 5). A pin 59 is passed through aligned holes in the lug 45 and limb 57. A collar 60 is fixed to the pin 59, and between the collar and the limb 57 a spring 61 is arranged. The pin 59 is capable of sliding longitudinally against the action of the spring 61 and can be fixed by catching a bent-over end portion of the pin in a recess 58A in the limb 58, after a displacement against the action of the spring. The rotatable shaft 6 is provided with pairs of projections 62 which are arranged to come into contact with the pins 59 on the plates 44 during the rotation of the shaft 6 and the cutting members 22 (see position shown in broken lines in FIGURE 3). The pins can however be displaced so that they cannot be touched by the projections 62, and can be fixed with the aid of the recess 58A.

FIGURES 6 and 7 show a second embodiment of a scraping member. The scraping member is formed in this case by co-planar spring steel bars 63, which are secured in pairs to a support 64 by bolts 65, the support being loosely mounted on the shaft 6. Each bar 63 is made from a single length of material and is essentially U-shaped, having limbs 66 and 67. The limbs 66 and 67 are bent over towards each other near their free ends. The other ends of the limbs are bent into a helical form at 68, and extend therefrom to the point of connection with the support 64. As shown in FIGURE 6, two pairs of bars 63 are provided. The shaft 6 may rotate freely within the support 64, which is connected by an arm 69 and a pin 70 with the frame beam 2. When a scraping member of this structure is employed, the rearmost part of the frame, which is formed as stated above by the beams 32, 33 and 35, may be dispensed with.

Lugs 71 are fixed one to each of the frame beams 3 and 4, each lug supporting an arm 73 through the agency of a substantially horizontal pivot pin 72 (see FIGURE 2), the arm 73 extending forwardly in the travelling direction, and slightly downwardly. The free end of each arm carries a ground wheel 74. Between each arm 73 and the frame beam 2 there is arranged a screw crank 75, the end of which is hinged to the arm 73 by a pin 75A. The screw crank 75 is rotatable in a tapped eyelet 76 fixed to the frame.

On either side of the center of the frame beam 2 there are arranged lugs 77, to each of which a pin 78 is fastened (FIGURE 1). The lower arms 79 of the three-point lift of the tractor can be fixed in known manner to the pins 78. At the center of the frame beam 2 there is erected a vertical post 80 having a forked upper end which can be coupled by a pin 81 with the upper arm 82 of the three-point lift of the tractor. In this way, the device is coupled to the tractor.

In operation, the device travels in the direction of the arrow P. During travel, the shaft 6 can be rotated by the power take-off shaft 18 of the tractor through the intermediary of the gear-wheel and chain transmission. The cutting members 22, seated on the shaft 6, thus move in the direction of the arrow B. The cutting members are thereby thrust into the soil, their cutting edges leading, and they cut loose lumps of earth. Each inwardly-facing pair of adjacent cutting members cuts loose a lump of earth and carries it round between them. It will here be appreciated that the cutter action is assisted by the cutting edges on the supporting members 20 and the bent-over portion 21. The facing, bent-over, ends of the bars 30 ensure efficient movement of the lump of earth. Since, as seen in a direction along the shaft 6, the cutting members are offset through an angle of about 36° relatively to each other, the cutting members will penetrate into the soil in a regular order of succession. After the clod has been carried round through approximately half a circle by the cutting member 22, it has been turned upside-down, i.e., the turf (if any) has been turned downwardly. At this instant the clod between the cutting members comes into contact with the associated scraping member, which is located on that side of the device where the cutting members move upwardly, so that the earth is pushed away from between the cutting members.

In the embodiment shown in FIGURES 1 and 5, one of the projections 62, seated on the shaft 6, catches the pin 59 of the scraping member, so that the shock of the scraping member assists in the release of the clod of earth (see position shown in FIGURE 3 in broken lines). The resilient arrangement of the scraping member results in that the clod of earth, when leaving the cutting members, is additionally accelerated in its downward movement. By adjusting the bar 50, the scraping member, as stated above, can be displaced with respect to the shaft 6. On the one hand, if the soil need be worked only to a shallow depth, the scraping members can be arranged at a relatively low level, near the soil, by the adjustment of the hindmost frame part (32, 33, 35) with respect to the foremost frame part (2, 3, 4) with the aid of the strip 39 and the pin 40. On the other hand, for a working at greater depth the scraping members can be arranged at a higher level above the soil by means of the strip 39 and pin 40.

The modified scraping member shown in FIGURES 6 and 7 operates in a similar fashion to those of the embodiment of FIGURES 1 to 5. The bent-over ends of the limbs 66 and 67 slide over the inside faces of the cutting members as the latter move upwardly, thus removing the soil therefrom.

Owing to the particular shape of the cutting edges of the cutting members, any obstacles encountered in the soil can be readily disengaged therefrom. Since the plane of the scraping member is inclined at an acute angle to the plane of the facing sides of the cutting members roots, touch stems and like bodies, carried along by the cutting members, will not detrimentally effect the operation of the device. Such bodies can leave the cutting members at the rear. Advantageously, the length of the cutting members, taken in the direction of rotation of the shaft, is less than one seventh and more than one sixteenth of the circumference of the circle described thereby. In order to ensure a satisfactory spading operation, the distance between the ends of the cutting members and the shaft is advantageously more than 40 cms., while the transmission between the power take-off shaft and the rotatable shaft 6 is chosen so that the speed of rotation of the cutting members is less than 100 revolutions per minute. The working depth of the device can be adjusted by the screw spindles 75 which serve to alter the height of the ground wheels 74 relative to the frame.

It has been found that, regardless of weather conditions and soil structure, the device described above normally ensures satisfactory cultivation of the soil due to the forcing effect of the scraping members on the soil.

What is claimed is:

1. A rotary plow comprising a movable frame, having a rotatable shaft, at least three paired cutting members, each pair comprising cooperating cutting elements, said elements being rigidly connected to said shaft, by substantially straight supports arranged side by side, said cutting elements having portions provided with cutting edges and comprising means for cutting a lump of earth during rotation of said shaft, a scraping member for each paired cutting member extending between said portions whereby said lump is removed from between the cutting elements as the latter are moving upwardly, the said scraping member being coupled to a support extending substantially parallel to said rotatable shaft.

2. The invention of claim 1 wherein the supports have catching members comprising bar means.

3. The invention of claim 1 wherein the supports have catching members comprising bar means extending along said supports to said portions on the cutting members.

4. The invention of claim 1 wherein the portions extend towards one another and rearwardly in respect to the direction of rotation of the said cutting elements.

5. The invention of claim 1 wherein the said cutting elements are connected to the shaft by supports extending radially from the shaft and having a front cutting edge.

6. The invention of claim 1 wherein the cutting edges of said portions are inclined towards each other at an angle of more than 20° and less than 160°.

7. The invention of claim 1 wherein the said scraping member is hinged to a frame beam, which extends substantially parallel to said rotatable shaft.

8. The invention of claim 7 wherein the said scraping member is pivotable about an axis substantially parallel to the shaft.

9. The invention of claim 1 wherein the said scraping member is resiliently mounted and means is provided for positioning the scraping member with respect to the rotatable shaft.

10. The invention of claim 9 wherein resilient means is connected with both the frame and the scraping member and the scraping member is vertically adjustable.

11. The invention of claim 9 wherein the scraping member is a plate, having one end hinged to the frame and the opposite end resiliently coupled to the frame.

12. A rotary plow comprising a movable frame having a rotatable shaft, at least one pair of cooperating cutting members being fixed to said shaft and arranged side by side, said cutting members having portions provided with cutting edges and comprising means for cutting a lump of earth during rotation of said shaft, a scraping member supported by said frame and extending between said portions whereby said lump is removed from between the cutting members as the latter are moving upwardly, said scraping member being resiliently mounted, means for positioning said scraping member relative to said rotatable shaft, a projection being mounted on said rotatable shaft whereby the projection cooperates with a part of said member to impart periodic mechanical shocks thereto.

13. A rotary plow, comprising a movable frame, having a rotatable shaft, at least three paired cutting members on said shaft, each pair comprising cooperating cutting elements, said elements being rigidly connected to said shaft by substantially straight supports arranged side by side, said cutting elements having portions provided with cutting edges and comprising means for cutting a lump of earth during rotation of said shaft, each of said cutting members of a pair being provided with a catching member, said catching member extending to the rear with reference to the normal rotation of said shaft, and inwardly.

14. The invention of claim 13 wherein said cutting elements comprise projections which extend rearwardly with reference to the normal direction of rotation through a length more than $\frac{1}{16}$ of the circumference of the circle described thereby and the length of a projection is less than $\frac{1}{7}$ of the circumference of said circle.

15. The invention of claim 14 wherein the said projections extend substantially parallel to each other.

16. The invention of claim 15 wherein said projections are formed by the ends of said cutting members and are facing each other.

17. A rotary plow comprising a movable frame, having a rotatable shaft, at least three paired cutting members, each pair comprising co-operating cutting elements, said elements being rigidly connected to said shaft by substantially straight supports arranged side by side, said cutting elements having portions provided with cutting edges, the said cutting edges of said cutting elements extending towards each other and to the rear with reference to the normal direction of rotation of the said shaft, each of said cutting members of a pair being provided with a catching member, said catching member extending to the rear with reference to the normal direction of rotation of the said shaft and inwardly.

References Cited by the Examiner
UNITED STATES PATENTS

| | | | |
|---|---|---|---|
| 855,075 | 5/1907 | Thomas | 172—547 |
| 1,057,472 | 4/1913 | Wiley | 172—39 |
| 1,433,961 | 10/1922 | Marciandi | 172—547 |
| 2,117,065 | 5/1938 | Lassas | 172—39 |
| 2,689,510 | 9/1954 | Petermann | 172—60 |

ABRAHAM G. STONE, *Primary Examiner.*

R. L. HOLLISTER, *Assistant Examiner.*